United States Patent [19]

Ikeda et al.

[11] Patent Number: 5,623,376
[45] Date of Patent: Apr. 22, 1997

[54] DIGITAL INFORMATION RESTORING DEVICE INCLUDING PERIOD DETECTOR

[75] Inventors: Shingo Ikeda; Shinichi Yamashita, both of Kanagawa, Japan

[73] Assignee: Canon Kabushiki Kaisha, Tokyo, Japan

[21] Appl. No.: 233,536

[22] Filed: Apr. 26, 1994

Related U.S. Application Data

[63] Continuation of Ser. No. 859,882, Mar. 30, 1992, abandoned.

[30] Foreign Application Priority Data

Apr. 3, 1991 [JP] Japan .................................. 3-070852
Jun. 24, 1991 [JP] Japan .................................. 3-178738

[51] Int. Cl.⁶ .......................... G11B 5/09; G11B 20/14; G11B 20/16
[52] U.S. Cl. .................................. 360/43; 371/6; 375/317
[58] Field of Search ................................ 360/39, 40, 43, 360/29, 32, 46, 51, 73.04, 71, 74.4, 33.1, 72.2, 14.3; 329/312; 341/53, 54; 371/6; 375/76, 317, 319, 333; 340/539; 73/116

[56] References Cited

U.S. PATENT DOCUMENTS

| | | | |
|---|---|---|---|
| 3,597,752 | 8/1991 | Eldert et al. | 360/40 |
| 4,040,100 | 8/1977 | Chan | 360/43 |
| 4,462,051 | 7/1984 | Chan | 360/44 |
| 4,473,853 | 9/1984 | Corkery | 360/72.2 |
| 4,562,549 | 12/1985 | Tanaka et al. | 360/74.4 X |
| 4,663,678 | 5/1987 | Blum | 360/72.2 |
| 4,672,365 | 6/1987 | Gehman et al. | 340/539 |
| 4,953,040 | 8/1990 | Hedtke et al. | 360/33.1 |
| 5,040,412 | 8/1991 | Wannenwetsch | 73/116 |
| 5,091,899 | 2/1992 | Adachi et al. | 360/143 X |
| 5,285,328 | 2/1994 | Behr et al. | 360/2 X |
| 5,315,449 | 5/1994 | Dayton et al. | 360/61 |

*Primary Examiner*—Aristotelis Psitos
*Assistant Examiner*—Patrick Wamsley
*Attorney, Agent, or Firm*—Robin, Blecker, Daley & Driscoll

[57] ABSTRACT

A digital information restoring device is arranged to detect time between level transition points of a digital signal which indicates digital information by means of variations in its period, output the resultant period data, calculate an average value of at least two period data among the output period data, and compare the average value with the aforesaid period data, and restore the digital information. The digital information restoring device is, therefore, capable of restoring the digital information at a high speed without using a high-speed PLL circuit or the like. The digital information restoring device may also be arranged to perform time-axis expansion of only part of the received period data, and input the resultant period data to a computing circuit to restore the digital information.

15 Claims, 5 Drawing Sheets

DIGITAL INFORMATION RESTORING DEVICE INCLUDING PERIOD DETECTOR

This is a continuation application under 37 CFR 1.62 of prior application Ser. No. 07/859,882, filed Mar. 30, 1992, now abandoned.

BACKGROUND OF THE INVENTION

1. Field of the Invention

The present invention relates to a digital information restoring device and, more particularly, to a device for restoring digital information indicated by variations in the period of a reproduced signal.

2. Description of the Related Art

A known example of this kind of digital information is a time code which is recorded on a tape-shaped recording medium (hereinafter referred to as "tape") along the length thereof, and the following description will be made in relation to such a time code for the purpose of illustration.

Figure 1:
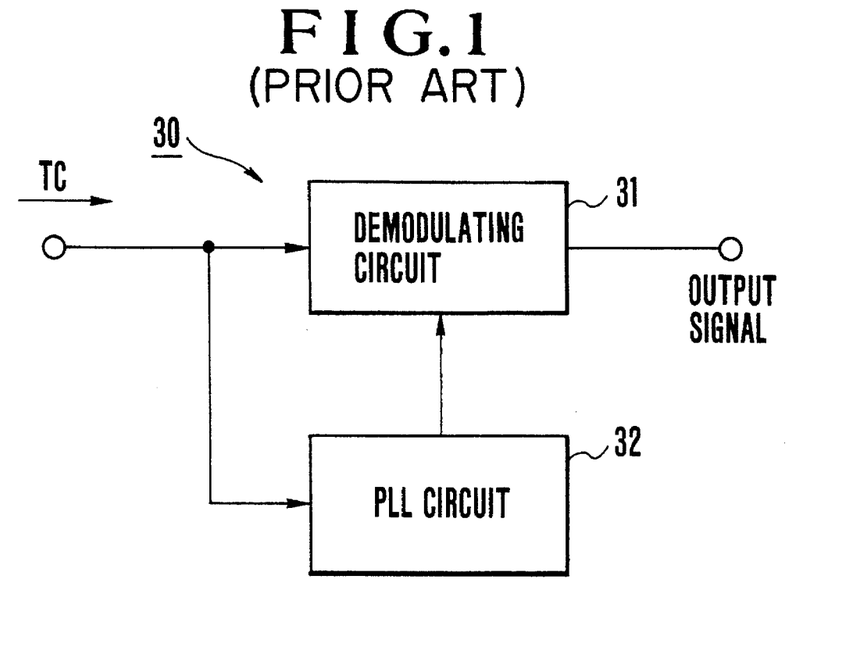
FIG. 1 is a schematic block diagram showing the construction of a conventional time code processing device.

A time code processing device 30, which has the construction shown in FIG. 1, has been proposed as a conventional type of device for reproducing the time code recorded on the tape by a tape recorder (not shown) and demodulating it into data represented by a sequence of "0" and "1".

Figure 2:
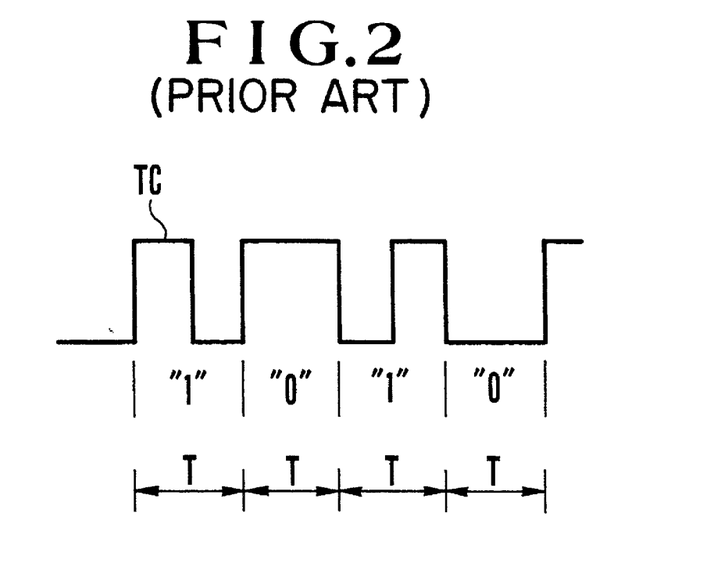
FIG. 2 is a diagram showing the waveform of the time code shown in FIG. 1.

The time code processing device 30 shown in FIG. 1 includes a demodulating circuit 31 and a PLL circuit (phase-locked loop) circuit 32. The time code processing device 30 receives as its input a time code TC represented by a two-valued waveform into which an output reproduced from the tape by the tape recorder is converted. The PLL circuit 32 generates a clock which is synchronized with the frequency of the time code TC. If it is assumed that the time code TC conforms to a BPM (bi-phase mark) method as shown in FIG. 2, the PLL circuit 32 generates a clock synchronized with the frequency of the time code TC, that is, a period T of the time code TC.

The BPM method is a digital modulation method in which in the case of data of "1", inversion occurs in the middle of the bit, while in the case of data of "0", inversion occurs not in the middle of the bit but at the boundary between bits.

The demodulating circuit 31 samples the time code TC based on the BPM method, on the basis of a clock of period (½)T generated by the PLL circuit 32, and compares the sample values in each period T, thereby determining whether the data in each period T is "0" or "1".

With the time code processing device 30 having the above-described arrangement, an output signal demodulated from the time code TC of BPM method and represented by a sequence of "0" and "1" can be obtained as the output signal of the demodulating circuit 31.

However, the time code processing device 30 has a number of problems. For example, if variations occur in the speed at which the tape is being reproduced by the tape recorder, the period of the time code TC also varies in proportion to the variations in the speed. For this reason, it is necessary to use as the PLL circuit 32 a circuit which can follow a wide range of frequency variations, with the result that the complexity of the circuit construction and hence the price of the entire device will increase.

SUMMARY OF THE INVENTION

It is, therefore, an object of the present invention to solve the above-described problems.

Another object of the present invention is to provide a digital information restoring device which is capable of correctly restoring digital information even if the input rate thereof varies, without the use of an expensive PLL circuit.

To achieve the above objects, in accordance with one aspect of the present invention, there is provided a digital information restoring device which comprises input means for inputting a digital signal which indicates digital information by means of variations in its period, period detecting means for detecting time between level transition points of the digital signal and outputting period data, computing means for calculating an average value of at least two period data among the period data outputted from the period detecting means, and restoring means for comparing the average value with the period data and restoring the digital information.

The above and other objects, features and advantages of the present invention will become apparent from the following detailed description of preferred embodiments of the present invention, taken in conjunction with the accompanying drawings.

DETAILED DESCRIPTION OF THE PREFERRED EMBODIMENTS

A first embodiment of the present invention will be described below with reference to the accompanying drawings.

Figure 3:
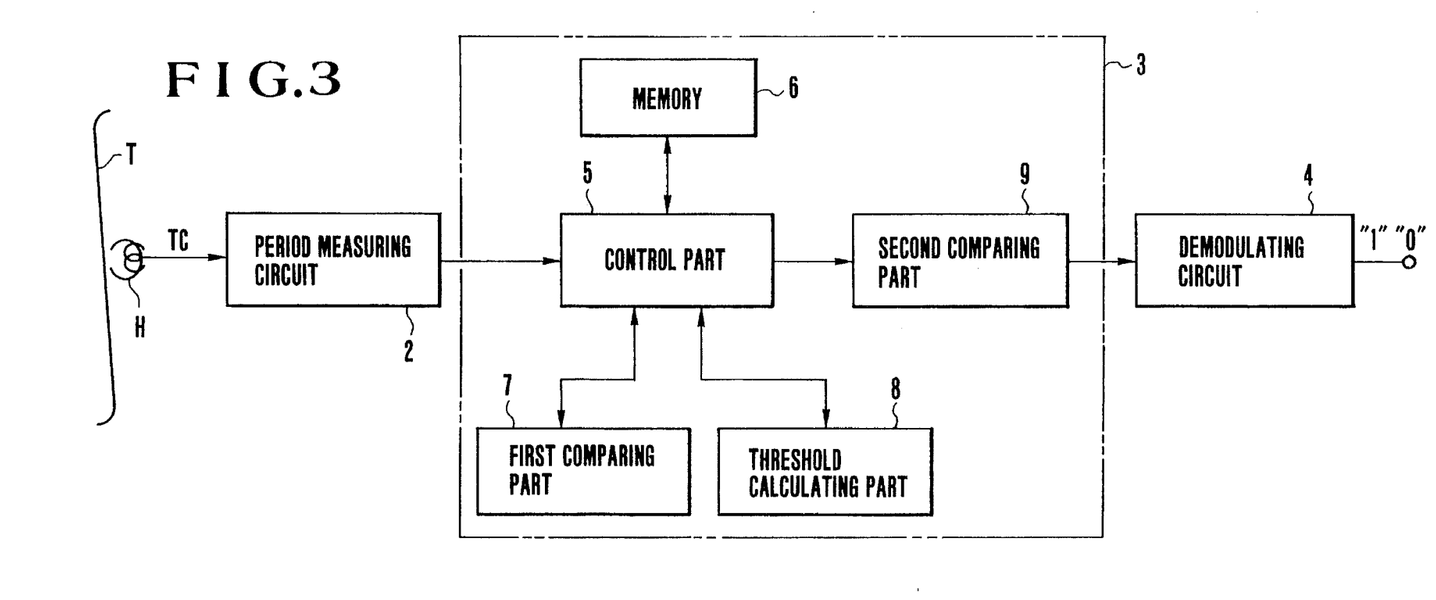
FIG. 3 is a schematic block diagram showing the construction of a time code processing device according to a first embodiment of the present invention.

A time code processing device according to the first embodiment of the present invention shown in FIG. 3 includes the following major components: a period measuring circuit 2 for receiving a time code TC of BPM method which is represented by a sequence of two values, "1" (high) and "0" (low), which are obtained by binarizing an output reproduced from a tape T by a fixed reproducing head H, and finding period data indicative of the time between each level transition point and the next level transition point of the time code TC; a computing circuit 3 for finding a transition point of each period data on the basis of the present and the previous period data provided by the period measuring circuit 2, then finding an average value of successive period data, either of which appears immediately before the obtained transition point of each period data and the other of which appears immediately after the same, and then calculating a threshold for time-code demodulation from the average value; and a demodulating circuit 4 for demodulating a signal corresponding to the time code on the basis of the threshold calculated by the computing circuit 3.

Figure 4:
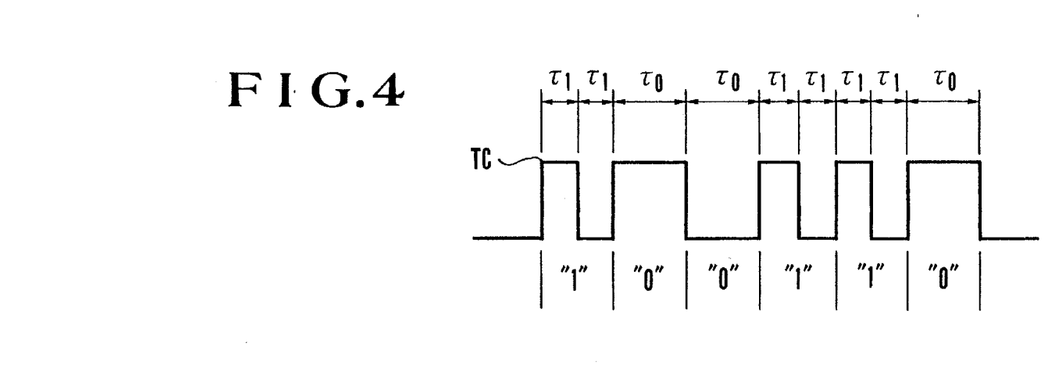
FIG. 4 is a diagram showing the waveform of the time code shown in FIG. 3.

The period measuring circuit 2 finds, as shown in FIG. 4, a period τ1 of each data "1" in the time code TC, in which inversion occurs in the middle of the bit, and a period τ0 of each data "0" in the time code TC, in which inversion occurs not in the middle of the bit but at the boundary between bits. The period measuring circuit 2 transmits the results to the computing circuit 3. Specifically, each of the periods τ0 and τ1 is obtained by counting clocks of high frequency within the inverting period of the time code TC. If there is no time axis variation during the finding of each of the periods τ0 and τ1, "τ0=2τ1" is obtained.

The computing circuit 3 includes the following components: a control part 5 including a CPU for receiving the values of the periods τ0 and τ1 provided by the period measuring circuit 2 and performing control of various parts; a memory 6 for storing the values of the periods τ0 and τ1 in sequence under the control of the control part 5; a first comparing part 7 for finding the points of transition from the period τ0 to the period τ1 or from the period τ1 to the period τ0 in a manner which will be described later, on the basis of the values of the respective periods τ0 and τ1 stored in the memory 6 and predetermined constants k1 and k2 (for example, k1=3/2 and k2=3/4); a threshold calculating part 8 for finding an average value of the periods τ0 and τ1, either of which appears immediately before each period transition point provided by the first comparing part 7 and the other of which appears immediately after the same, and calculating a threshold S for time code demodulation; and a second comparing part 9 for comparing the threshold S calculated by the threshold calculating part 8 with the values of the periods τ0 and τ1 and transmitting to the demodulating circuit 4 a demodulation control signal corresponding to each data "0" and "1" of the time code TC.

Figure 5:
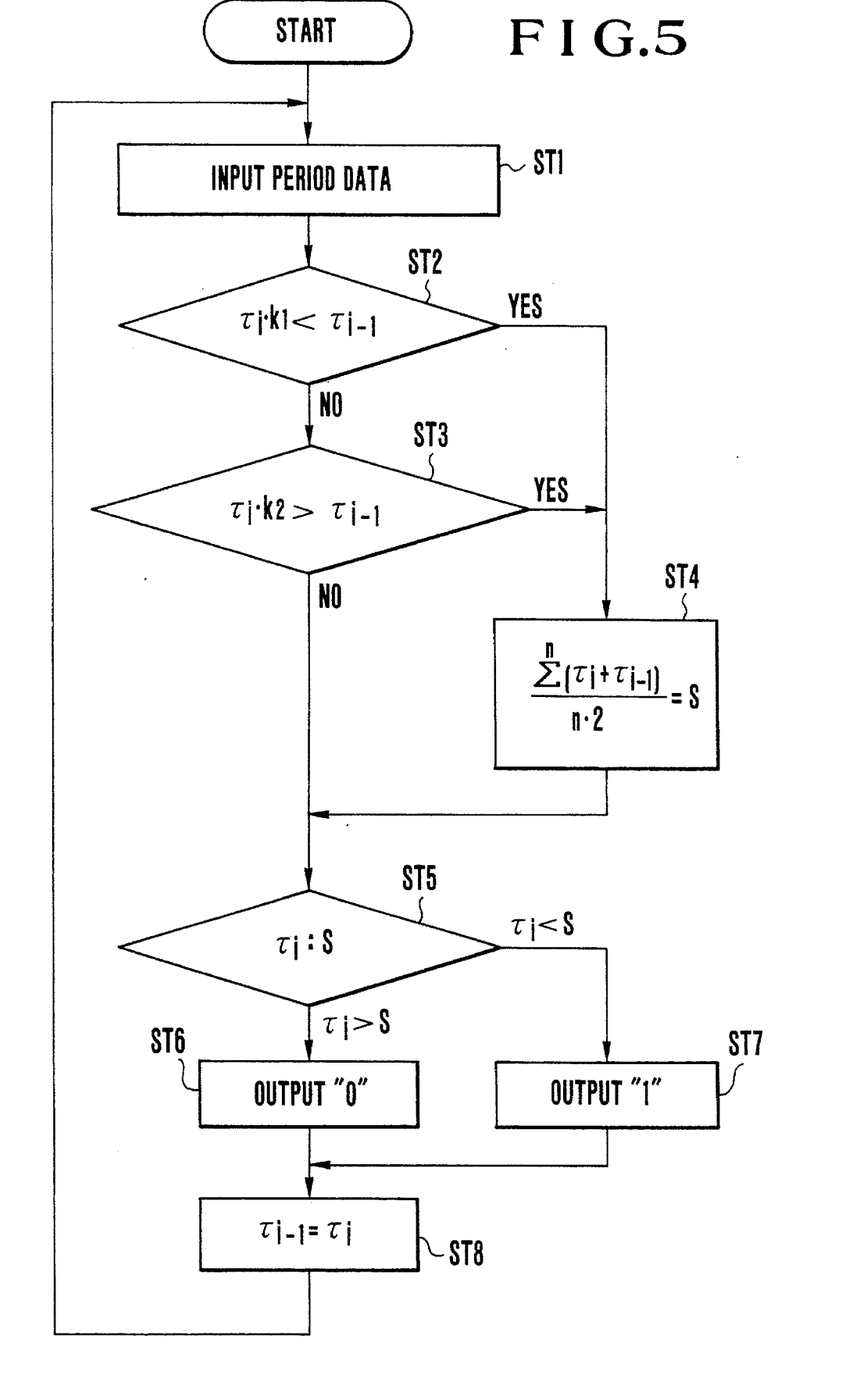
FIG. 5 is a flowchart showing the operation of the device shown in FIG. 3.

The operation of the time code processing device will be described below with reference to the flowchart of FIG. 5 as well. In the following description, it is assumed that the general term of each of the periods τ0 and τ1 is represented by τi or τi−1, that is, the present and previous periods are represented by τi or τi−1, respectively.

The period measuring circuit 2 receives the time code TC of BPM method (ST1), finds each of the periods τi and τi−1 between the level transition points of the time code TC, and transmits the periods τi and τi−1 to the control part 5. The respective values of the periods τi and τi−1 are then transmitted to and stored in the memory 6 under the control of the control part 5.

The first comparing part 7 performs comparative computations on τi·k1<τi−1 or τi·k2>τi−1 (ST2, ST3) on the basis of the values of the respective periods τi and τi−1 and the values of the constants k1 and k2 under the control of the control part 5, thereby finding transition points for the respective periods τi and τi−1. If τi·k1<τi−1 or τi·k2>τi−1 is established, the threshold calculating part 8 calculates the threshold S, i.e., an average of the periods τi and τi−1, from Equation (1) under the control of the control part 5 (ST4). For k1=3/2, τi·k1<τi−1 is established when τi=τ1 and τi−1=τ0, and for k2=3/4, τi·k2>τi−1 is established when τi=τ0 and τi−1=τ1. The threshold calculating part 8 calculates an average of the past n averages of the periods τi and τi−1 which respectively appear immediately before and after each of the transition points of τ1 →τ0 and τ0 →τ1.

Therefore, the output S of the threshold calculating part 8 is represented as:

$$S = \sum_{i}^{n} (\tau i + \tau i - 1)/n \cdot 2 \qquad (1)$$

Then, the second comparing part 9 makes comparison between the present period τi and the threshold S (ST5). In the case of τi>S, the second comparing part 9 transmits a demodulation control signal to the demodulating circuit 4 to cause it to send out an output signal "0". In the case of τi<S, the second comparing part 9 transmits a demodulation control signal to the demodulating circuit 4 to cause it to send out an output signal "1".

In the above-described manner, the demodulating circuit 4 sends out the output signal "0" or "1" (ST6 and ST7).

The threshold calculating part 8 substitutes τi into τi−1 during the period between the operation of the second comparing part 9 and the operation of the demodulating circuit 4, and is ready for the next calculation (ST7).

In the above-described operation of the time code processing device 1, it is possible to demodulate a signal corresponding to the time code TC without using a complicated, expensive PLL circuit which would have heretofore been needed, irrespective of a wide range of frequency variations of the time code TC which varies in proportion to variations in the speed of the tape.

A second embodiment of the present invention will be described below with reference to FIGS. 6 to 8(a) and 8(b).

Figure 6:
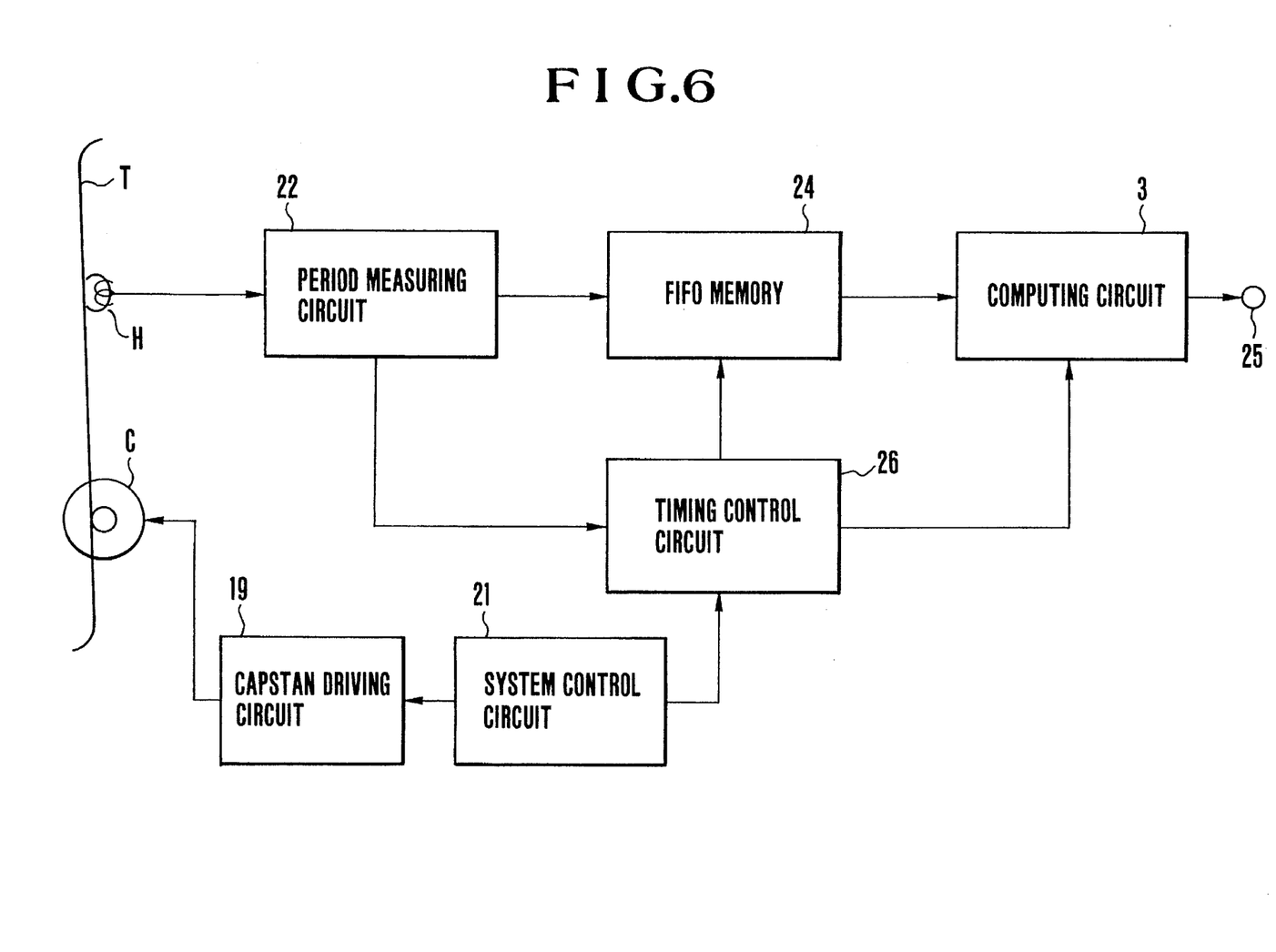
FIG. 6 is a schematic block diagram showing the construction of a time code processing device according to a second embodiment of the present invention.

FIG. 6 is a schematic block diagram showing the construction of the second embodiment of the present invention. In FIG. 6, the same reference numerals are used to denote constituent elements which are substantially identical to those shown in FIG. 3.

A time code signal of the bi-phase mark coding method is reproduced by the stationary reproducing head H, as in the first embodiment described above. A period measuring circuit 22 measures the pulse period of the time code signal of bi-phase mark coding method (the time between level transition points of the time code signal), and supplies the measured period data to a memory 24 and supplies to a timing control circuit 26 a timing signal indicative of the end of the period measurement.

The memory 24 is a FIFO (first-in/first-out) memory capable of asynchronously performing writing and reading of data, and functions as a circuit which thins out the period data and performs time axis transform under the control of the timing control circuit 26. As will be described in more detail, period data stored in the memory 24 are read out and supplied to the computing circuit 3. The computing circuit 3 decodes a time code from the aforesaid period data under the control of the timing control circuit 26, and provides a two-valued signal represented by a combination of "0" and "1" at an output terminal 25.

In the second embodiment, the timing control circuit 26 controls writing to and reading from the memory 24 in accordance with the speed of time-code reproduction in a manner which will be described below. It is assumed here that the throughput of the computing circuit 3 can follow the speed of time-code reproduction which is n times that of time-code recording and that the speed of time-code reproduction is m times a tape speed for time-code recording. A system control circuit 21 controls a capstan driving circuit 19 to control the speed of rotation of a capstan C, that is, the travel speed of a tape T. The system control circuit 21 supplies data indicative of the aforesaid tape speed to the timing control circuit 26.

Figure 7A:
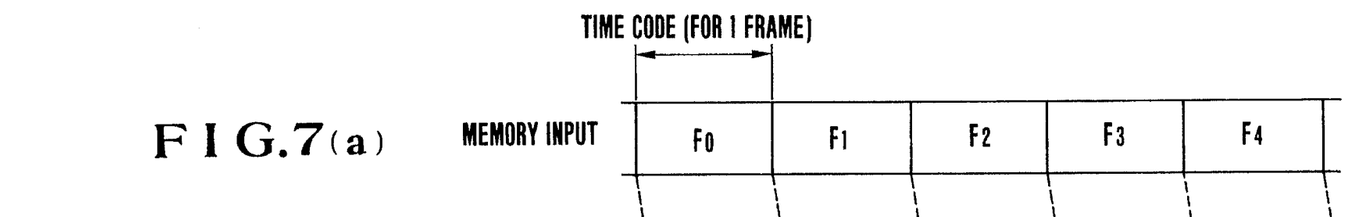
FIGS. 7(a) and 7(b) are timing charts showing the timing relationship between memory inputs and memory outputs during a low-speed reproduction.
Figure 7B:
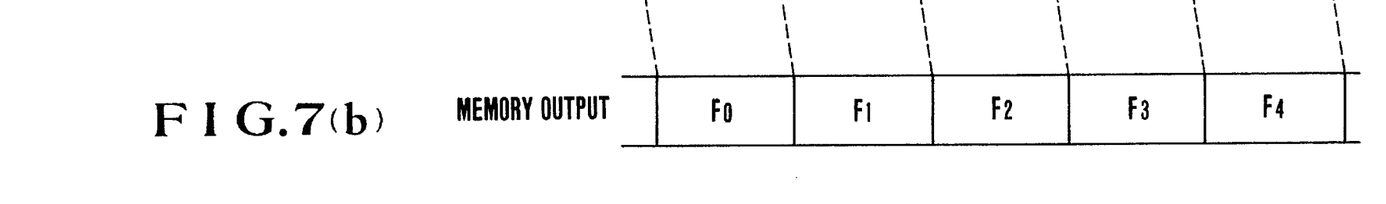

The case of |n|≧|m| is first described. FIGS. 7(a) and 7(b) show the timing relationship between inputs and outputs to and from the memory 24. FIG. 7(a) shows the input data of the memory 24, and FIG. 7(b) shows the output data of the memory 24. In the case of |n|≧|m|, the throughput of the computing circuit 3 can sufficiently follow the speed of time-code reproduction. Accordingly, the timing control circuit 26 controls the memory 24 in accordance with data from the system control circuit 21 so that all the period data outputted from the period measuring circuit 22 can be written into and read from the memory 24. In consequence, period data outputted from the period measuring circuit 22 are applied to the computing circuit 3 after a time delay corresponding to the time taken to complete the writing to and the reading from the memory 24. The operation performed in this case is completely the same as that used in the first embodiment described above. In FIGS. 7(a) and 7(b), each of F0 to F4 represents period data (consisting of a plurality of bits) which are out when a video signal for one frame is reproduced. Such period data are hereinafter referred to simply as "period data for one frame".

Figure 8A:
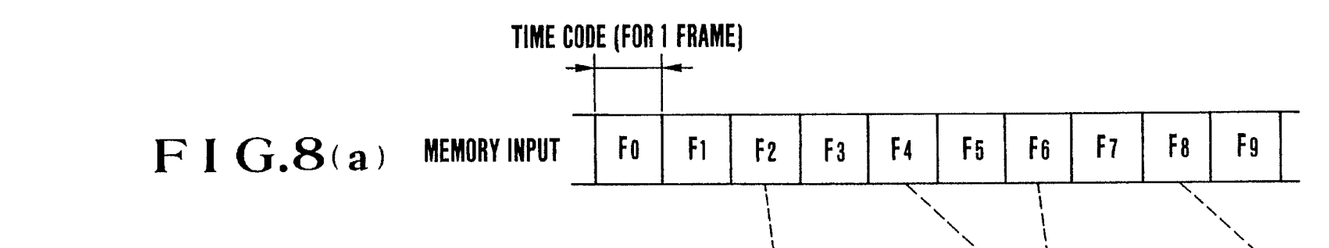
FIGS. 8(a) and 8(b) are timing charts showing the timing relationship between memory inputs and memory outputs during a high-speed reproduction.
Figure 8B:
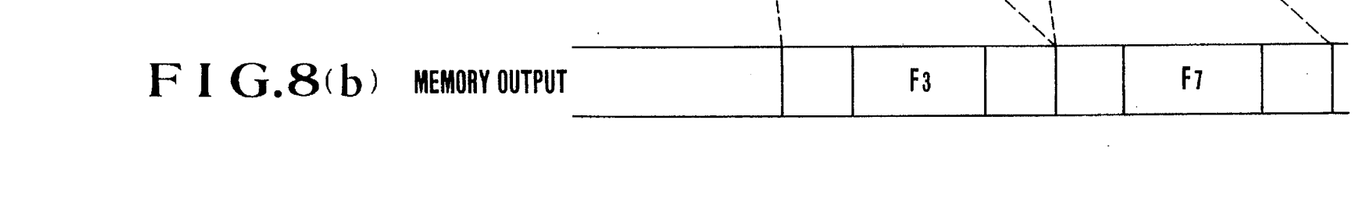

The case of |n|<|m| is then described. FIGS. 8(a) and 8(b) show the timing relationship between inputs and outputs to and from the memory 24. FIG. 8(a) shows the input data of the memory 24, and FIG. 8(b) shows the output data of the memory 24. In the case of |n|<|m|, since the throughput of the computing circuit 3 is unable to follow the speed of time-code reproduction, partial omission of data and time axis transform are carried out in the memory 24. More specifically, the timing control circuit 26 controls the memory 24 in accordance with data from the system control circuit 21 so that, of period data outputted from the period measuring circuit 22, period data for two frames are selectively written into the memory 24 and the stored data are read out at a speed equivalent to the speed of time-code reproduction which is n times that of time-code recording, that is, the period data for two frames are read out within a time period which is equivalent to the time period taken to reproduce two successive frames at the speed which is n times that of time-code recording. After the completion of the data reading, of period data outputted from the period measuring circuit 22, other period data for two frames are written into the memory 24. Of the period data outputted from the period measuring circuit 22, data which are not written into the memory 24 are ignored and discarded.

Each period data word applied from the memory 24 to the computing circuit 3 is spaced apart from the next period data by a time period equivalent to one frame. However, the computing circuit 3 can be informed of timing to read each period data from the memory 24, by a timing signal from the timing control circuit 26, thereby appropriately decoding the period data from the memory 24. The decoded time code is provided at the output terminal 25.

In the above-described second embodiment, after data are partially omitted by the selective writing thereof into the memory 24, time axis transform is carried out during the reading of the data from the memory 24. However, the present invention is not limited to such a procedure. For example, all the period data outputted from the period measuring circuit 22 may be stored into the memory 24, and period data which were written immediately previously or those which are presently being written may be selectively taken out and the selected period data may be subjected to time axis transforms and read out.

As is readily understood from the above description, in accordance with the second embodiment, coded signals which are successively inputted at a speed exceeding the throughput of the computing circuit can be restored intermittently but satisfactorily, so that it is possible to cope with a tape speed far higher than the tape speed that can be handled in the first embodiment. In addition, since an inexpensive computing circuit may be utilized, cost can be reduced.

Although the second embodiment has been described in relation to the bi-phase mark coded signal by way of example, the present invention may of course be applied to a time code which conforms to another coding method.

Although the second embodiment has been described in relation to the reading and restoration of a time code, it is apparent that the present invention can be applied to various kinds of restoring devices arranged to restore and output digital information which is sequentially inputted thereto.

What is claimed is:

1. A digital information restoring device comprising:
   (a) input means for inputting a digital signal which indicates digital information by means of variations in its period;
   (b) period detecting means for detecting a time at a transition point of pulse-width of the digital signal and outputting period data;
   (c) computing means including first averaging means for calculating an average value of at least two period data among the period data outputted from said period detecting means, said computing means further including second averaging means for calculating an average of average values calculated by said first averaging means; and
   (d) restoring means for comparing the average value calculated by said second averaging means with the period data and restoring the digital information.

2. A device according to claim 1, wherein said computing means includes detecting means for detecting whether two successive period data have varied in period, and wherein said first averaging means computes an average value of the two successive period data which have varied in period, in accordance with an output from said detecting means.

3. A device according to claim 1, wherein said input means includes reproducing means for reproducing the digital signal from a tape-shaped recording medium.

4. A device according to claim 3, wherein the digital signal is recorded on the tape-shaped recording medium along a length thereof, and wherein said reproducing means includes a fixed head.

5. A device according to claim 4, wherein the digital signal is a signal modulated by a bi-phase mark method.

6. A device according to claim 4, wherein the digital information is a time code indicative of time.

7. A digital information restoring device comprising:
   (a) reproducing means for reproducing from a tape-shaped recording medium a digital signal which indicates digital information by means of variations in its periods;
   (b) period detecting means for detecting a time at a transition point of pulse-width of the digital signal and outputting period data;
   (c) computing means including first averaging means for calculating an average value of at least two period data among the period data outputted from said period detecting means, said computing means further including second averaging means for calculating an average of a plurality of average values calculated by said first averaging means; and
   (d) restoring means for comparing the period data with the average value calculated by said second averaging means and restoring the digital information.

8. A digital information restoring device comprising:
(a) period detecting means for detecting a time at a transition point of pulse-width of a digital signal which indicates digital information by means of variations in its periods, and outputting period data;
(b) computing means including first averaging means for calculating an average value of at least two period data among the period data outputted from said period detecting means, said computing means further including second averaging means for calculating an average of a plurality of average values calculated by said first averaging means; and
(c) restoring means for comparing the period data with the average value calculated by said second averaging means and restoring the digital information.

9. A digital information restoring device comprising:
(a) input means for inputting a digital signal which indicates digital information by means of variations in its period;
(b) period detecting means for sequentially detecting a time at a transition point of pulse-width of the digital signal, and sequentially outputting period data signals which correspond to the detected time periods;
(c) computing means for sequentially calculating respective average values of pairs of said period data signals, said computing means further calculating a threshold value from a plurality of said average values; and
(d) restoring means for comparing the period data signals with the threshold value calculated by said computing means and restoring the digital information.

10. A device according to claim 9, wherein said threshold value calculated by said computing means is an average of said plurality of average values.

11. A device according to claim 9, wherein said computing means includes detecting means for detecting whether two successive period data signals have substantially different values, and said computing means computes an average value of the two successive period data, in accordance with an output from said detecting means, if the two successive period data signals have substantially different values.

12. A digital information restoring device comprising:
(a) reproducing means for reproducing from a tape-shaped recording medium a digital signal which indicates digital information by means of variations in its period;
(b) period detecting means for sequentially detecting a time at a transition point of pulse-width of the digital signal, and sequentially outputting period data signals which correspond to the detected time periods;
(c) computing means for sequentially calculating respective average values of pairs of said period data signals, said computing means further calculating a threshold value from a plurality of said average values; and
(d) restoring means for comparing the period data signals with the threshold value calculated by said computing means and restoring the digital information.

13. A device according to claim 12, wherein said threshold value calculated by said computing means is an average of said plurality of average values.

14. A digital information restoring device comprising:
(a) period detecting means for sequentially detecting a time at a transition point of pulse-width of a digital signal which indicates digital information by means of variations in its periods, and sequentially outputting period data signals which correspond to the detected time periods;
(b) computing means for sequentially calculating respective average values of pairs of said period data signals, said computing means further calculating a threshold value from a plurality of said average values; and
(c) restoring means for comparing the period data signals with the threshold value calculated by said computing means and restoring the digital information.

15. A device according to claim 14, wherein said threshold value calculated by said computing means is an average of said plurality of average values.

* * * * *

UNITED STATES PATENT AND TRADEMARK OFFICE
CERTIFICATE OF CORRECTION

PATENT NO. : 5,623,376
DATED : April 22, 1997
INVENTOR(S) : Ikeda et al.

It is certified that error appears in the above-identified patent and that said Letters Patent is hereby corrected as shown below:

Title page,
    Item [57] Abstract, line 14, after "information" insert -- at a far higher speed --.

Col. 5, line 18, after "which are" insert -- read --.

Col. 5, line 47, after "period data" insert -- word --.

Signed and Sealed this

Twenty-third Day of June, 1998

Attest:

BRUCE LEHMAN

Attesting Officer    Commissioner of Patents and Trademarks